(12) United States Patent
Grieser

(10) Patent No.: US 10,829,212 B2
(45) Date of Patent: Nov. 10, 2020

(54) RETRACTION / EXTENSION OF A LANDING GEAR IN AN AIRCRAFT

(71) Applicant: AIRBUS HELICOPTERS DEUTSCHLAND GMBH, Donauworth (DE)

(72) Inventor: Wolfram Grieser, Riemerling (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 610 days.

(21) Appl. No.: 15/605,234

(22) Filed: May 25, 2017

(65) Prior Publication Data

US 2017/0341738 A1    Nov. 30, 2017

(30) Foreign Application Priority Data

May 25, 2016  (EP) .................................... 16400016

(51) Int. Cl.
*B64C 25/60*    (2006.01)
*B64C 25/22*    (2006.01)

(52) U.S. Cl.
CPC .............. *B64C 25/60* (2013.01); *B64C 25/22* (2013.01)

(58) Field of Classification Search
CPC ......... B64C 25/22; B64C 25/60; B64C 25/58; B64C 25/62; B64C 2025/008; F15B 15/1466; F15B 15/26; F15B 15/268; F15B 2211/7057; F16F 9/56; F16F 9/34; F16F 9/082; F16F 9/092; F16F 9/325; F16F 9/0027; F16F 9/3214; F16F 9/0245; F16F 9/0254; F16F 9/0263; F16F 2230/0041; E05C 17/30
See application file for complete search history.

(56) References Cited

U.S. PATENT DOCUMENTS

| | | | |
|---|---|---|---|
| 1,513,971 A | 11/1924 | Davis | |
| 2,106,289 A | 1/1938 | Wallace | |
| 2,814,482 A | 11/1957 | Anderson et al. | |
| 2,892,626 A | 6/1959 | Scott et al. | |

(Continued)

FOREIGN PATENT DOCUMENTS

| | | |
|---|---|---|
| DE | 10243332 | 4/2004 |
| EP | 0556078 | 8/1993 |

(Continued)

OTHER PUBLICATIONS

Japanese Office Action for Application No. JP2017-029732, dated Dec. 19, 2017, 3 pages.

(Continued)

*Primary Examiner* — Philip J Bonzell
(74) *Attorney, Agent, or Firm* — Brooks Kushman P.C.

(57) ABSTRACT

A telescoping strut for a retractable landing gear in an aircraft. The telescoping strut comprises a pre-pressurized and central extension chamber extending along the telescoping strut and a surrounding retraction chamber. For retraction, an hydraulic generation architecture of the aircraft feeds a single input/output passage of the surrounding retraction chamber with a overcoming fluid pressure that overwhelms a extension positive pressure in the central extension chamber and opposes the effect of the pre-pressurizing. The retraction system is for instance for a rotorcraft.

20 Claims, 3 Drawing Sheets

(56) References Cited

U.S. PATENT DOCUMENTS

| | | | |
|---|---|---|---|
| 4,291,850 A | 9/1981 | Sharples | |
| 4,630,788 A | 12/1986 | Veaux et al. | |
| 4,907,760 A | 3/1990 | Sealey et al. | |
| 5,094,407 A | 3/1992 | Jampy et al. | |
| 5,310,140 A | 5/1994 | Veaux et al. | |
| 6,059,228 A | 5/2000 | Koizumi et al. | |
| 6,279,854 B1 | 8/2001 | Lindahl | |
| 6,619,445 B2 * | 9/2003 | Forster | F16F 9/062 188/297 |
| 7,426,983 B2 * | 9/2008 | Ducos | B64C 25/58 188/266 |
| 2002/0112931 A1 * | 8/2002 | Forster | F16F 9/062 188/315 |
| 2006/0163427 A1 * | 7/2006 | Ducos | B64C 25/58 244/104 FP |
| 2007/0057117 A1 | 3/2007 | Payen et al. | |
| 2009/0095839 A1 | 4/2009 | Lassus et al. | |
| 2009/0218444 A1 | 9/2009 | Lahargou et al. | |
| 2010/0288878 A1 | 11/2010 | Bennett | |
| 2012/0080558 A1 | 4/2012 | Barbieri et al. | |
| 2014/0151501 A1 | 6/2014 | Kondo et al. | |

FOREIGN PATENT DOCUMENTS

| | | |
|---|---|---|
| GB | 2057629 | 4/1981 |
| JP | H01229103 A | 9/1989 |
| JP | H1159592 A | 3/1999 |
| JP | 2011504829 A | 2/2011 |
| JP | 2014132189 A | 7/2014 |
| WO | 2014174302 | 10/2014 |

OTHER PUBLICATIONS

Extended European Search Report for European Application No. EP 16400016.8, Completed by the European Patent Office, dated Nov. 11, 2016, 5 Pages.

* cited by examiner

-- PRIOR ART --

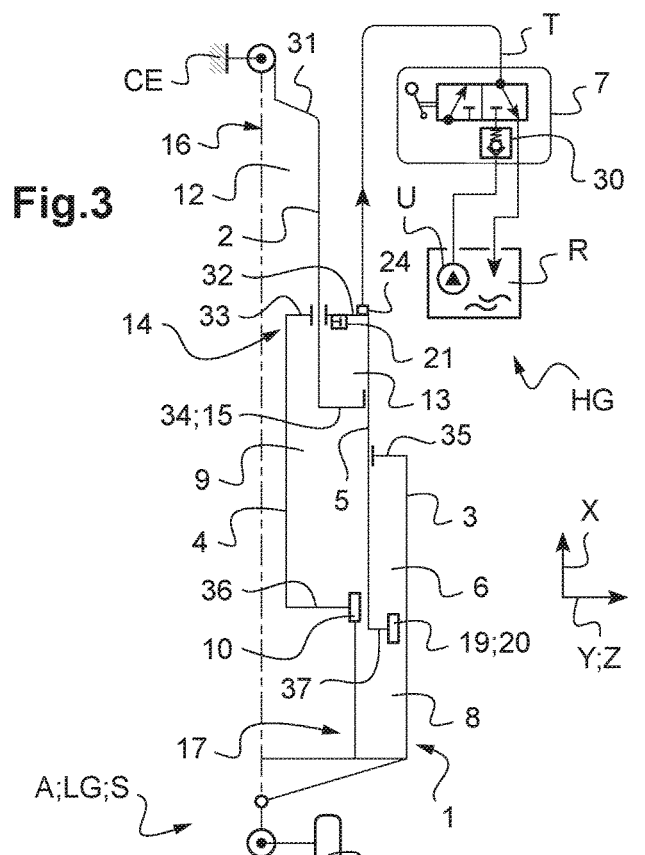
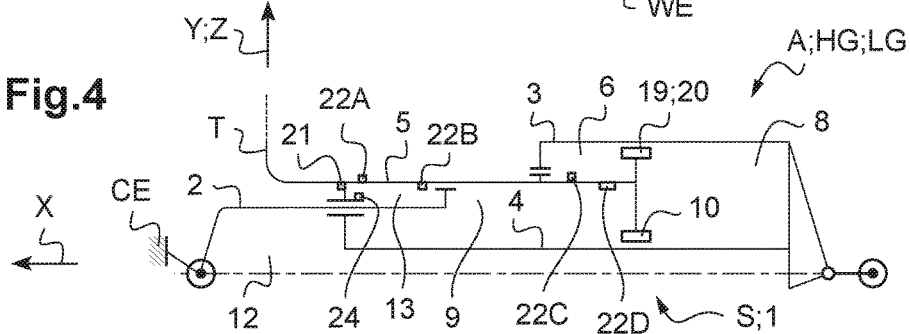

RETRACTION / EXTENSION OF A LANDING GEAR IN AN AIRCRAFT

CROSS-REFERENCE TO RELATED APPLICATIONS

This application claims priority to European patent application No. EP 16400016.8 filed on May 25, 2016, the disclosure of which is incorporated in its entirety by reference herein.

BACKGROUND OF THE INVENTION

Field of the Invention

The invention generally relates to retraction/extension actuation systems for landing gears in aircrafts. More particularly, the invention concerns pressurized fluid retraction/extension actuation systems for landing gears, undercarriages or other touch down devices.

So called retractable landing gears are movable between an extended position for instance for touch down and a retracted position at least partly withdrawn inside a body structure of the aircraft for instance during flight. In such a purpose, the aircraft includes an actuation system. Frequently, such actuation systems also provide damping/shock absorbing functions to the landing gear.

The invention applies to such actuation systems of retractable landing gears for instance for rotorcrafts. These landing gears are specific and have to fulfill distinct and further requirements to those of other aircrafts, sometimes antagonistic. For instance, load transfer from landing gears to the body structure of the rotorcraft has to be optimized versus weight, while the landing gear shall remain as compact as possible.

Description of Related Art

For enabling retraction functions and damping functions some landing gears use distinct components. Although this allows for advantageously arranging distinct components in separate locations of the aircraft, this may lead to a too heavy, complex and/or massive whole configuration.

Other landing gears integrate into a single strut various functions, for instance retraction/extension/damping.

Many aircrafts are anyway equipped with a hydraulic architecture. Then, it is possibly beneficial to integrate the retraction/extension/damping functions of the undercarriage into the hydraulic architecture.

In addition, an emergency extension function is sometimes required to be available even in case of hydraulic power loss in the aircraft. When not merely relying on gravity, this may involve providing the aircraft with an additional actuator for instance electric, besides the actuation system enabling proper working retraction/extension and possibly damping.

Another option for obtaining emergency extension is installation on-board of an emergency hydraulic tank. This tank makes permanently available in the hydraulic architecture a convenient amount of fluid at a sufficient hydraulic pressure in a case of main hydraulic power loss.

Such additional emergency actuator/tank would increase complexity, weight, costs and volume of the overall aircraft. This increase is particularly detrimental in rotorcrafts.

In the domain of hydraulic actuation systems for aircraft's landing gears, some documents have been considered.

The document DE10243332 describes another known hydro-pneumatic shock absorber for aircraft. The shock absorber has a hydro-pneumatic damper cylinder. The piston has a closed gas-filled inner chamber and moves in a cylinder ring chamber, also filled with hydraulic fluid. The cylinder ring chamber contains a second cylinder, which is moved in and out by hydraulic fluid. A piston in the hydro-pneumatic damper cylinder has a wide section on its edge, which is in sealing engagement inside the ring chamber. Throttle apertures for fluid passage are located in the wide section. Two stops are provided on a wall of the cylinder ring chamber. This integrated multi-function strut provides a partial compression of the shock absorber for the retraction function. Active hydraulic power is required for any extension. The hydro-pneumatic shock absorber combines the requirements for shock-absorbing, taxiing even in curves and for kneeling.

The document GB2057629 describes a shock absorber for a helicopter undercarriage. The shock absorber comprises a first hydraulic chamber. A cylinder encloses a low pressure elastic return chamber and a volume is in communication with the first chamber by at least one compression throttling orifice. An expansion throttling valve controls the expansion of the low pressure chamber. A mechanical locking device comprises a hydraulic locking valve for locking a jack rod in a given position after filling the chamber used for lowering. Another chamber communicates with an adjoining volume of oil contained in a further annular chamber, which is disposed around the first chamber.

This damper shock absorber is capable to bear at least fractions of crash landing energy without transferring this energy as loads onto the helicopter structure. Focus is given on low hydraulic pressure for normal operation and on high hydraulic pressure for crash landing.

The document U.S. Pat. No. 4,907,760 describes an aircraft landing gear assembly having a shock absorber. First and second tubular members and a floating member are defining a first pressure chamber. A reserve chamber and a second pressure chamber have passageway for providing a metered hydraulic orifice between the reserve chamber and the first pressure chamber. The landing gear assembly is for combination of low pressure and high pressure shock absorbers with retraction function, with the aim to reduce the overall length of the assembly.

Other prior art documents have been considered, i.e. U.S. Pat. Nos. 1,513,971, 4,291,850, 4,630,788, 4,907,760, 5,094,407, 6,279,854, US2007057117, US2009218444, US2009095839, US2012080558 and WO2014174302.

Although generally appropriate, the prior art may have the following disadvantages or technical problems.

A technical problem to solve would be ensuring a reliable availability of consistent amounts of hydraulic power and fluid volumes.

Another technical problem would be assuming the retraction/normal extension/damping functions and possibly emergency functions, in a simple, lightweight and compact manner. A further technical problem would be enhancing the overall energetic efficiency of an aircraft in line with more demanding legal/customer requirements.

BRIEF SUMMARY OF THE INVENTION

The invention overcomes at least one of these technical problems, by providing as objects, a telescoping strut, a landing gear, an aircraft and a method with the features of the claims.

The inventive telescoping strut is for extension/retraction/damping of a landing gear in an aircraft. The telescoping strut comprises at least an extension chamber, a retraction chamber and a damper chamber, each of the extension, retraction and damper chambers being formed by tubes slidably telescoping along a longitudinal direction of the telescoping strut. The telescoping strut comprises two attachment connectors for securing the telescoping strut to the landing gear and to a body structure of the aircraft.

According to the invention, the tubes comprise an upper medium tube and an innermost lower tube forming together a sealed outer shell for the extension chamber that is central and pre-pressurized.

The central extension chamber is lengthening centrally in the telescoping strut between a top end of the upper medium tube and a bottom end of the innermost lower tube along the longitudinal direction. A top end of the innermost lower tube is slidably guided in an intermediate portion between ends, of the upper medium tube along the longitudinal direction. The upper medium tube is rigidly secured to one of the attachment connectors and the innermost lower tube is rigidly secured to the other attachment connector.

The telescoping strut further comprises an outermost damping tube and a floating upper intermediate tube, an outer shell of the upper medium tube and an inner shell of the floating upper intermediate tube forming together the surrounding retraction chamber that is radially surrounding the central extension chamber locally. The telescoping strut has only one fluid input/output passage for fluid circulation from an hydraulic source in an hydraulic generation architecture of the aircraft to the surrounding retraction chamber for opposing an extension positive pressure in the central extension chamber, so that the surrounding retraction chamber counteracts the extension positive pressure to provoke a longitudinal shortening of the central extension chamber that operates retraction of the telescoping strut when the surrounding retraction chamber is fed through the fluid input/output passage with an overcoming fluid pressure overwhelming the extension positive pressure.

This embodiment provides simple functions and structure for retraction, extension and damping, thanks to a highly integrated arrangement of tubes and chambers. Besides this embodiment, it results optimally sized flows on demand from the hydraulic pump during retraction/normal extension operations, due to limited shifted hydraulic volume. Optionally, in case of emergency, the pre-pressurized extension chamber allows a practical and prompt extension of the telescoping strut, without involving the hydraulic source.

Moreover, the floating upper intermediate tube is slidably guided around the upper medium tube and is slidably guided in the outermost damping tube.

The outermost damping tube is rigidly secured to one of the attachment connectors. The outermost damping tube and the floating upper intermediate tube form together a first chamber that is pre-pressurized at first pre-loaded pressure.

The outermost damping tube and the innermost lower tube form together a second chamber that is pre-pressurized with a fluid at a second pre-loaded pressure and that is selectively communicable with the first chamber. Thus, the first chamber and the second chamber form a pneumatic spring system in which a fluid may flow from a chamber to the other.

In an embodiment, the second chamber may be outwardly delimited by the outermost damping tube and the floating upper intermediate tube, the innermost lower tube inwardly delimiting the second chamber.

The above allows for a compact and efficiently integrated structure for the telescoping strut.

In an embodiment, locally the first chamber may be outwardly delimited by the outermost damping tube and inwardly by the floating upper intermediate tube.

Thanks to the above, the volume/fluid power ratio of the invention is optimized. Also, available stroke and sensitivity for a given volume or length dimension is optimized as well.

In an embodiment, at least one force limiting valve may be installed on an outwards internal flange of the floating upper intermediate tube.

The above allows for optimized shock absorbing adapting to various damping needs faced by the inventive telescoping strut, both in terms of stroke dimension and sensitivity to harshness of shocks to be absorbed. Moreover, such an embodiment allows to limit the transferred forces from wheel to body structure during faster compressions, e.g. during the landing shock.

In an embodiment, the telescoping strut may have an inside mid redundant chamber that is pre-pressurized, the inside mid redundant chamber extending along the longitudinal direction partly between the central extension chamber and the second chamber and radially between the surrounding retraction chamber and the first chamber outwardly. The inside mid redundant chamber may be delimited by an internal upper flange and an internal inwards flange of the innermost lower tube and by an inwards upper flange of the upper medium tube.

The optional redundant chamber might be advantageously used as a fine tuning of the extension forces of damping/retraction or as an emergency means for extension in case of a pneumatic leak in the central extension chamber.

In an embodiment, at least one trim device may be installed on the innermost lower tube. The trim device is controlling a flow between the inside mid redundant chamber and the second chamber for alternative and/or extra gas pressure for extension of the telescoping strut.

Such damping orifices enhance the tuning of the damping/retraction of the telescoping strut.

In practical, at least one damping orifice may also be installed between the floating upper intermediate tube and the outermost damping tube, the damping orifice controlling a flow between the first chamber and the second chamber for providing a flow restriction to the damping fluid while streaming from the second chamber to the first chamber during shock absorbing compression of the telescoping strut.

Such an arrangement provides efficient damping.

In an embodiment, at least one extension locking mechanism may be installed radially between the floating upper intermediate tube and the upper medium tube, to mechanically keep the telescoping strut in an extended position until overcoming fluid pressure is applied for retraction to the surrounding retraction chamber.

Such an extension locking mechanism provides safety features, insuring that the extended position is maintained regardless the pneumatic/hydraulic status of the telescoping strut.

In an embodiment, at least one extension locking mechanism may be installed on the floating upper intermediate tube to mechanically keep the surrounding retraction chamber in a shortened position determined for extension of the telescoping strut until the overcoming fluid pressure is applied to the surrounding retraction chamber.

Such an arrangement of extension locking mechanisms provides for compact layout and efficient locking of the extension position.

In an embodiment, at least two pairs of mechanism stops may be mounted on the floating upper intermediate tube, for limiting an extension longitudinal stroke and a retraction/contraction longitudinal stroke of the floating upper intermediate tube relatively the upper medium tube along the longitudinal direction.

Such an arrangement of mechanical stops provides for efficient location of the full extension and retraction positions.

In an embodiment, the two pairs of mechanical stops may comprise an upper mid mechanical stop mounted inside the surrounding retraction chamber, a lowermost mechanical stop mounted outside the first chamber, a lower mid mechanical stop mounted inside the first chamber and an uppermost mechanical stop mounted outside the floating upper intermediate tube.

Such an arrangement of mechanical stops provides for efficient and accurate control of the full extension and retraction positions.

In an embodiment, at least one pair of full reciprocation switches may be installed in the telescoping strut, a first full reciprocation switch of the pair being installed to indicate that the fully retracted position is reached by the telescoping strut and a second full reciprocation switch being installed to indicate that the fully extended position is reached by the telescoping strut. The first full reciprocation switch is outwardly arranged on the upper medium tube and the second full reciprocation switch is arranged upright an upper outer flange of the floating upper intermediate tube.

Such a cooperating arrangement provides for accurate control and timely actuation of the telescoping strut extension.

In practice, the second full reciprocation switch may be installed so as to the telescoping strut to be instantly coupled with an extension locking mechanism in charge of securing a fully extended position of the telescoping strut when the telescoping strut is locked in the fully extended position.

In an embodiment, the extension positive pressure in the central extension chamber may be chosen between 0.5 MPa and 1 MPa. The first pre-loaded pressure in the first chamber is chosen between 1 MPa and 2 MPa.

The values of the extension positive pressure offer optimized extension resources.

The above pressure values allow the chambers to behave as cooperative shock absorbers against distinct compressing forces applied to the telescoping strut. The above pressure range allows intense shock absorbing against harsh compressing forces applied to the landing gear.

Another object of the invention is a landing gear for an aircraft having a body structure and a hydraulic generation architecture, the landing gear having at least one touch-down device.

The landing gear comprises at least one telescoping strut as exposed above and articulated to the body structure, the landing gear being articulated to the touch-down device, the fluid input/output passage of the telescoping strut being connected to the hydraulic generation architecture to provide for extension function of the landing gear when the fluid input/output passage is fed.

The fluid input/output passage of the telescoping strut is connected to the hydraulic generation architecture to provide for normal extension function of the landing gear when the fluid input/output passage is fed.

The extension of the inventive landing gear is advantageously obtained with a single hydraulic input/output to the telescoping strut, simplifying the hydraulic structure and allowing a compact landing gear layout.

Another object of the invention is an aircraft having at least a landing gear, a body structure and a hydraulic generation architecture. The landing gear is as exposed above.

The hydraulic generation architecture is operatively connected to the telescoping strut and is under control of a hydraulic unit of the hydraulic generation architecture. The hydraulic generation architecture comprises at least one hydraulic pump connected by a single pressure channel to the hydraulic unit for fluid circulation from a fluid reservoir to the telescoping strut, the hydraulic unit being connected to the fluid input/output passage of the telescoping strut.

The inventive aircraft is advantageously a rotorcraft e.g. chosen among: helicopters, hybrid or compound rotary aircrafts, tilt-rotors aircrafts, UAV rotorcrafts and inhabitable rotorcrafts including remote piloting functions.

Another object of the invention is a method of operating a landing gear in an aircraft. The method includes the steps of:
  retraction motion of the telescoping strut,
  extension motion of the telescoping strut, and
  damping motion, by the telescoping strut for operating the damping function of the landing gear.

The telescoping strut is as exposed above. The extension motion is operated without the surrounding retraction chamber fed by a hydraulic generation architecture of the aircraft and the retraction motion results from a retraction command provoking the displacement of a control valve in a hydraulic unit of the hydraulic generation architecture. The displacement of the control valve allows the hydraulic generation architecture to feed the fluid input/output passage of the telescoping strut with the overcoming fluid pressure, so as to overwhelm the extension positive pressure and oppose the effect of the central extension chamber.

The inventive method advantageously provides for simple and efficient extension, with optimized operation and layout of the hydraulic generation architecture.

In an embodiment, the method may include a step of emergency extension of the telescoping strut without fluid pressure from the hydraulic generation architecture. The step of emergency extension provides releasing the floating upper intermediate tube and the innermost lower tube slidably moving relatively the upper medium tube under the remaining effect of the pre-pressure in the central extension chamber and/or the inside mid redundant chamber.

These features offer a simple, power free and efficient emergency extension of the landing gear.

BRIEF DESCRIPTION OF THE DRAWINGS

Presently preferred embodiments of the invention are exposed in detail below, with reference to the attached drawings. These drawings are as follows.

FIG. 3 is a schematic split longitudinal view of an embodiment of the invention, showed in an extended position, of a landing gear, a telescoping strut and an appending hydraulic generation architecture.

FIG. 4 is a view similar to the one of FIG. 3, showing another embodiment of the telescoping strut in an extended position.

FIG. 5 is a view similar to the one of FIG. 3, showing in an extended position another embodiment of the inventive telescoping strut, depraved of optional inside mid redundant chamber.

The FIGS. 1-8 show three orthogonal directions X, Y and Z.

The direction X is referred to as being longitudinal and corresponds to the length dimension of the arrangements described. Terms such as upper/lower, top/bottom or fore/aft are relative thereto. When referring to telescopic arrangements, the direction X is also called axial. For instance, a diameter or cross section of an arrangement is considered as being mainly perpendicular to the direction X.

The direction Y is called transverse and corresponds to the radial or lateral dimensions of the arrangements described. Terms like thickness, side or left/right or aside are relative thereto. For instance, a diameter or cross section is considered as extending in a plane parallel to this direction Y.

Another direction Z is referred to as the crosswise direction. Similarly to the transverse direction Y, the crosswise direction Z corresponds to a transverse axis of the arrangements described.

DETAILED DESCRIPTION OF THE INVENTION

Figure 1:
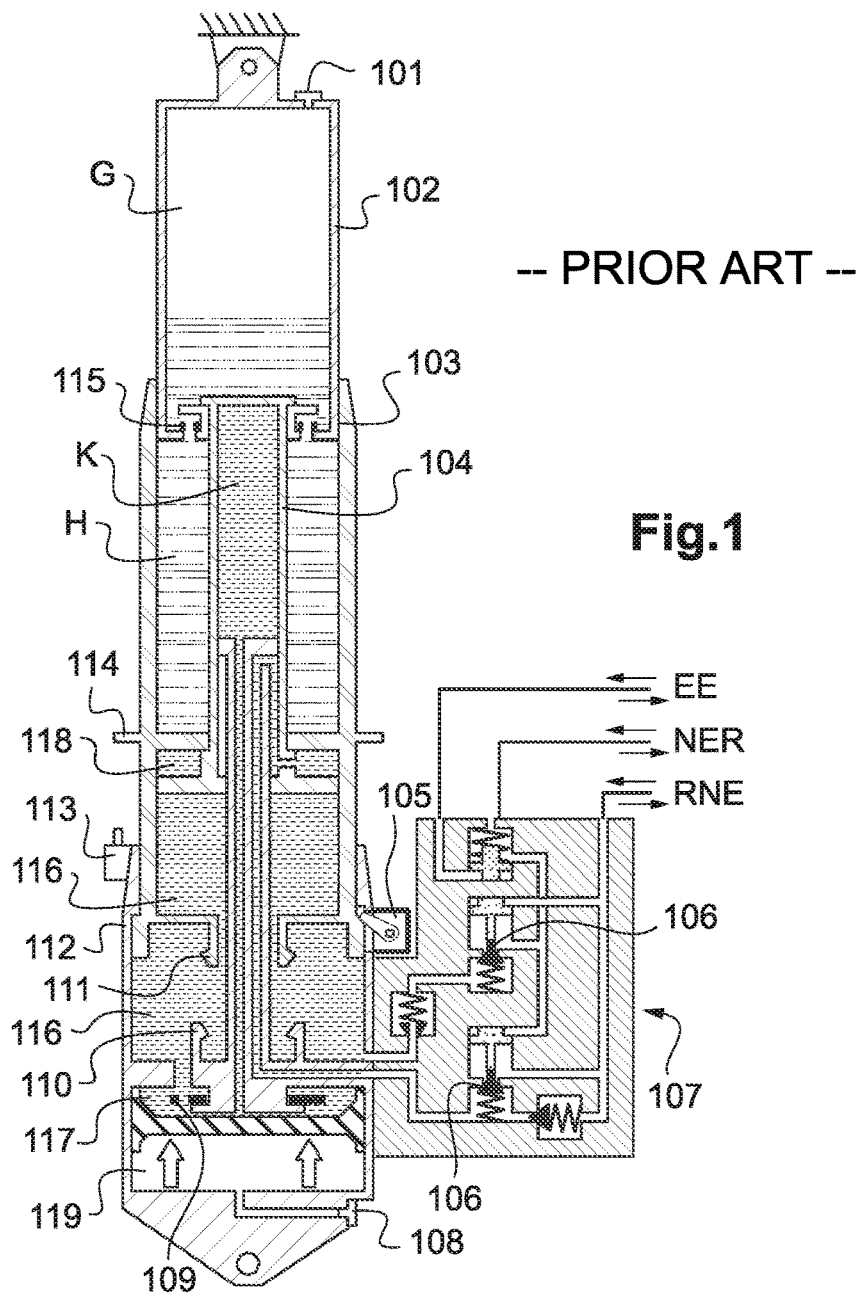
FIG. 1 is a split front and transverse view of a known telescoping hydraulic retraction/extension strut for a rotorcraft, as discussed above.

FIG. 1 shows a known hydraulic retraction/extension/damping actuator strut for a rotorcraft landing gear.

The strut has a low-pressure shock absorber charging valve 101 and an upper rod 102 articulated to a body structure of the rotorcraft. A strut casing 103 is slidably mounted on the rod 102, for telescopic movements. A plunger tube 104 of the strut is slidably mounted in the casing 103 and guided in the upper rod 102.

An actuator rocker lever 105 indicates extension position of the strut. The actuator rocker lever 105 is located outside the casing 103, below a switch contactor 114 and in longitudinal register with a locking ring 111 and a retraction actuator 112, when the strut is in the extended position.

The retraction actuator 112 cooperates with the switch contactor 114 for operating a retracted position switch 113. A top throttling valve 115 is provided on the bottom of the rod 102 to selectively communicate or restrict fluid flow between a chamber G in the rod 102 and a chamber H in an upper portion of the casing 103. The chamber G integrates a fluid/gas separating organ for maintaining nitrogen in the upper portion of the chamber G and hydraulic fluid in the lower portion.

This known strut comprises from top to bottom, the chamber G, the low-pressure shock absorber fluid chamber H partly surrounding an upper extension chamber K, an extension chamber 116 between the lower piston of the plunger tube 104 and a bottom portion of the casing 103, a retracting chamber 118 between the lower piston and the chamber H, an high-pressure shock absorber fluid chamber 117 and an high-pressure gas chamber 119, at the bottom location of the strut.

A control unit 107 comprising distribution valves is located aside the casing 103. In the retraction actuator 112 is a high-pressure shock absorber charging valve 108 and a bottom throttling valve 109. Flexible locking claws 110 and the locking ring 111 are located in the retraction actuator 112 at a bottom portion of the strut.

In the control unit 107, a pressure input channel EE is for emergency extension. An input/output channel NER is fed for normal extension. Another input/output channel RNE in the unit 107 is fed for normal and emergency extension. The pressure input/output channel RNE and the pressure input channel EE communicate in emergency mode with the extension chambers 116 and K. The pressure input/output channel RNE communicates with the retraction chamber 118. Except for retraction and extension operations, the hydraulic fluid distribution valves 106 are closed thus operating hydraulic locking of upper and lower extension chamber and of the retraction chamber.

Figure 2:
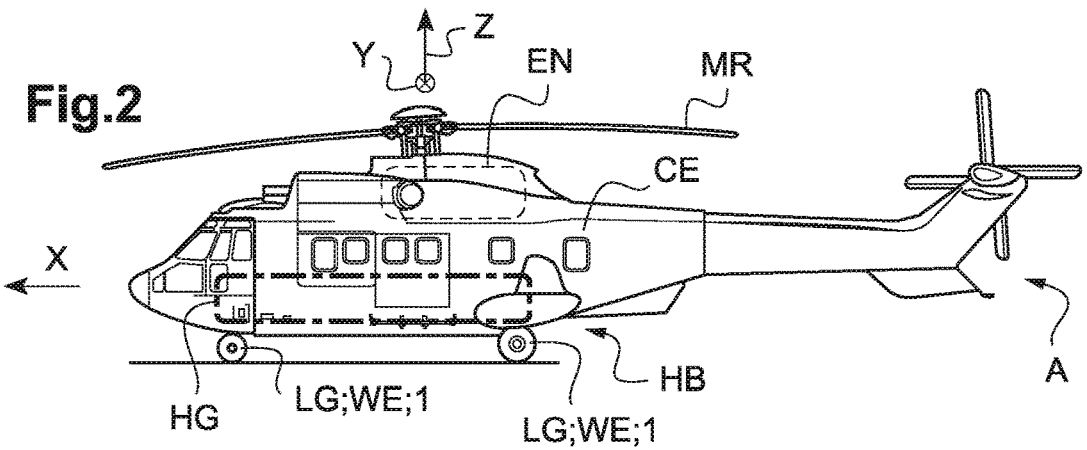
FIG. 2 is a schematic lateral elevation view of an inventive aircraft including landing gears capable of retraction/extension/damping functions.

On the FIG. 2, an aircraft A as per the invention is illustrated. This example of aircraft A is a rotorcraft. Other embodiments of the invention provides for distinct types of aircrafts, for instance light fixed wings aircrafts, sports aircraft or the like. Depending on embodiments, the rotorcraft is an helicopter, an hybrid or compound rotary aircraft, a tilt-rotor aircraft, an unmanned aerial vehicle (UAV) rotorcraft or an inhabitable rotorcraft including remote piloting functions. The invention is especially appropriate for aircrafts having a maximum speed not over about 500 km/h.

The rotorcraft A of FIG. 2 is a helicopter provided with at least one main rotor MR. The main rotor MR is carried by a body structure CE. Classically, the rotorcraft A has a power plant EN including one or a plurality of engines. The main rotor MR is mechanically driven by the power plant EN carried by the body structure CE.

The rotorcraft A of FIG. 2 has an undercarriage including three landing gears LG, which are mechanically articulated to the body structure CE, so as to be retractable Each landing gear LG includes one or a plurality of touch-down devices e.g. in the form of wheels WE. In other examples of the invention, depending on the missions to which the aircraft is dedicated, as well as on the type of aircraft, the touch-down devices are for instance skids, buoyancy devices or the like.

Classically, the rotorcraft A of FIG. 2 has a hydraulic generation architecture HG.

On FIG. 3, the hydraulic generation architecture HG is used for generating fluidic power. On demand, the hydraulic generation architecture HG feeds with pressurized fluid at least one telescoping strut 1 integrated to the landing gear LG.

In that purpose, the hydraulic generation architecture HG may include a mechanically or electrically driven hydraulic pump U installed on-board the rotorcraft A. The hydraulic generation architecture HG of FIG. 3 also comprises a fluid reservoir R, an input/output channel T and a hydraulic unit 7.

For instance, when control of the landing gear LG is required, the hydraulic pump U of the hydraulic generation architecture HG supplies on demand sufficient fluid at a given fluid pressure for movements of the telescoping strut 1.

Depending on embodiments, the hydraulic pump U is operated permanently, and fluid transfer to the telescoping strut 1 is made or discontinued by a control valve of the hydraulic unit 7. In other embodiments, the hydraulic pump U is activated by a control valve of the hydraulic unit 7 and fluid transfer is then operated.

So as to have the landing gear LG operatively activated, the telescoping strut 1 is articulated to the touch down device WE and connected to the hydraulic generation architecture HG. Besides, the telescoping strut 1 is articulated to the body structure CE.

Figure 6:
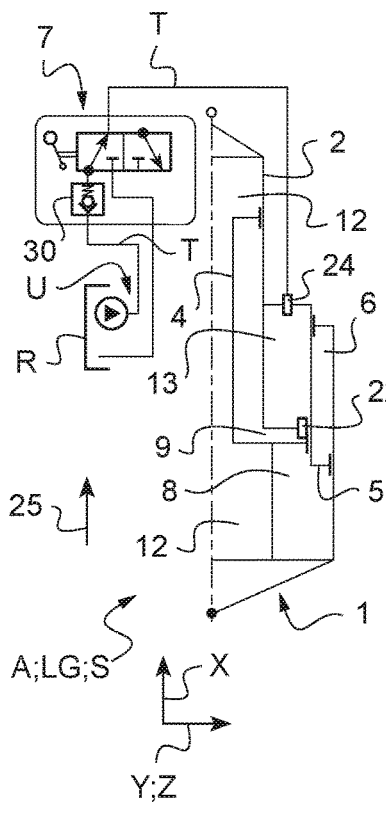
FIG. 6 is a view similar to the one of FIG. 3, showing another embodiment of the inventive telescoping strut in a retracted position, and the corresponding controlling status of the hydraulic unit.

The hydraulic generation architecture HG of FIGS. 3 and 6 includes a check valve 30 also called non-return valve, for free fluid flow only possible in one direction, i.e. from the pump to the control valve. The check valve 30 is integrated into the hydraulic unit 7 and is used in some cases of emergency to maintain fluid in the retraction chamber should any failure of the hydraulic generation architecture HG occurs.

Whatever the embodiment, the inventive telescoping strut 1 comprises a series of tubes. Each tube allows telescoping motions along the longitudinal direction X, relative to at least another tube.

Classically, at least one dynamic seal is installed between each pair of relatively telescoping tubes. Each dynamic seal offers tight and fluid/gas proof contact, even during sliding movements of the relatively telescoping tubes.

Furthermore, it is obvious that such a telescoping strut 1 has a rotational symmetry around a central rotational axis. However, to simplify the comprehension of the several embodiments of the invention, FIG. 3 to FIG. 8 show only a half-section of the telescoping strut 1.

As shown on FIG. 3, the inventive telescoping strut 1 comprises:
an upper medium tube 2,
an outermost damping tube 3,
an innermost lower tube 4, and
a floating upper intermediate tube 5.

Cross sections of these tubes 2-5 are circular. Along the longitudinal direction X, each of these tubes has an intermediate portion, a top end and a bottom end. In such a tube, the intermediate portion is between the corresponding top or upper end and the bottom or lower end, along the longitudinal direction X.

On FIG. 3, are shown an inwards upper flange 31 belonging to the upper medium tube 2, an upper outer flange 32 belonging to the floating upper intermediate tube 5, an internal upper flange 33 belonging to the innermost lower tube 4, an inwards upper flange 34 belonging to the upper medium tube 2, an outer inwards flange 35 belonging to the outermost damping tube 3, an internal inwards flange 36 belonging to the innermost lower tube 4 and an internal lower flange 37 belonging to the floating upper intermediate tube 5.

For instance, on FIG. 3, the intermediate portion of the upper medium tube 2 is located between a top end 16 of the upper medium tube 2 and a bottom end 15 of the upper medium tube 2.

In other embodiments of the invention the telescoping strut 1 is mounted upside down relatively to the FIGS. 3-8, e.g. for favorable digressive effect in damping. In so-called upside down embodiments, the upper medium tube 2 is at a bottom location of the telescoping strut 1 and the opposite end at the top of the telescoping strut 1, when installed on the aircraft. In such a case, the terms top/upper are to be understood as "first", and the terms bottom/lower are to be understood as "second".

FIG. 3 shows that the upper medium tube 2 forms together with the innermost lower tube 4 a sealed outer shell for a central extension chamber 12.

The central extension chamber 12 extends on FIG. 3, from the top end 16 of the upper medium tube 2 to a bottom end 17 of the innermost lower tube 4, along the longitudinal direction X. A top end 14 of the innermost lower tube 4 is slidably mounted in an intermediate portion between the top end 16 and the bottom end 15 of the upper medium tube 2, along the longitudinal direction X.

The top end 16 is rigidly secured to an attachment connector for articulating the telescoping strut 1 to the body structure CE of the aircraft A, for instance. Oppositely along the longitudinal direction X, the bottom end 17 of the innermost lower tube 4 is rigidly secured to another attachment connector for articulating the telescoping strut 1 to the landing gear LG. Of course, other embodiments of the inventive telescoping strut 1 are articulated to the body structure CE and to the landing gear LG in distinct locations than the top end 16 and bottom end 17, e.g. upside down and/or remote from top/bottom ends.

In the telescoping strut 1, an outer shell of the upper medium tube 2 defines together with an inner shell of the floating upper intermediate tube 5 a surrounding retraction chamber 13.

The intermediate portion of the upper medium tube 2 outwardly guides a top end of the floating upper intermediate tube 5. The top end of the floating upper intermediate tube 5 forms an inwards upper flange that delimits the top end of the surrounding retraction chamber 13. The inwards upper flange forms a cross sectional shoulder, e.g. orthogonal to the direction X.

The bottom end 15 of the upper medium tube 2 forms an outwards lower flange that slidably guides an intermediate portion of the inner shell of the floating upper intermediate tube 5. The outwards lower flange delimits the bottom end of the surrounding retraction chamber 13. The outwards lower flange forms another cross sectional shoulder, e.g. orthogonal to the direction X.

From hydraulic standpoint, the outwards lower flange of the upper medium tube 2, the internal upper flange and the internal inwards flange of the innermost lower tube 4, as well as the outwards internal flange of the floating upper intermediate tube 5, act as hydraulic pistons. Such hydraulic pistons provoke sliding motions of the upper medium tube 2, the innermost lower tube 4 and the floating upper intermediate tube 5, correspondingly.

At a bottom end longitudinally opposed to the outwards internal flange of the floating upper intermediate tube 5, the outermost damping tube 3 of FIG. 3 is rigidly secured to the other attachment connector articulating the telescoping strut 1 to the landing gear LG.

Furthermore, the outermost damping tube 3 and the floating upper intermediate tube 5 delimit together a first chamber 6. Besides, the outermost damping tube 3 and the innermost lower tube 4 delimit together a second chamber 8.

More precisely, an outer shell of the floating upper intermediate tube 5 is slidably guided along the outermost damping tube 3, allowing the longitudinal dimension of the first chamber 6 to be varied.

A top end of the outermost damping tube 3 forms an outer inwards flange 35, i.e. a further cross sectional shoulder, e.g. orthogonal to the direction X. Inside the telescoping strut 1, at a bottom end the floating upper intermediate tube 5 forms an outwards internal flange 37, i.e. a supplemental cross sectional shoulder.

The outer inwards flange and the outwards internal flange are orthogonal to the direction X in the example of FIG. 3.

The outer inwards flange and the outwards internal flange delimit a varying dimension of the first chamber 6 along the direction X.

The outwards internal flange also separates the first chamber 6 from the second chamber 8. At a location opposed to the outwards internal flange along the longitudinal direction X, the second chamber 8 is delimited by the bottom end of the outermost damping tube 3 and by the bottom end of the innermost lower tube 4. Depending on longitudinal motion of the outwards internal flange, the longitudinal dimension of the second chamber 8 varies for shock absorption.

In the embodiment of FIG. 3, the first chamber 6 is pre-pressurized with gas, e.g. nitrogen. The second chamber 8 is filled with fluid, e.g. oil.

Moreover, the second chamber 8 is outwardly delimited by the outermost damping tube 3 and inwardly by the floating upper intermediate tube 5. The second chamber 8 is also outwardly delimited by the central extension chamber 12.

Then, in extended position of the telescoping strut 1, an overall longitudinal dimension of the central extension chamber 12 is superior to the cumulated minimal dimension of the surrounding retraction chamber 13, of the first chamber 6 and of the second chamber 8.

Furthermore such a telescoping strut may include an inside mid redundant chamber 9 that is optional. The inside mid redundant chamber 9 radially extends between the central extension chamber 12 outwardly and the first chamber 6 inwardly.

Along the direction X, the inside mid redundant chamber 9 extends from transverse register with the surrounding retraction chamber 13 to a bottom portion of the central extension chamber 12. The inside mid redundant chamber 9 is radially defined by the innermost lower tube 4 inwardly, and by the floating upper intermediate tube 5 outwardly.

More precisely, at a bottom end of the inside mid redundant chamber 9 the innermost lower tube 4 forms the internal inwards flange 36 that longitudinally delimits upwards the inside mid redundant chamber 9. The internal inwards flange 36 separates the inside mid redundant chamber 9 from the bottom portion of the central extension chamber 12. The inside mid redundant chamber 9 is pre-pressurized with gas, at a nominal pressure that is chosen around the one of the central extension chamber 12.

At a top end of the inside mid redundant chamber 9 the innermost lower tube 4 forms the internal upper flange 33 that longitudinally delimits the inside mid redundant chamber 9 downwards. The internal upper flange 33 separates the inside mid redundant chamber 9 from a top portion of the central extension chamber 12. On FIG. 3, the internal inwards flange 36 and the internal upper flange are orthogonal to the direction X.

The sliding bearing and the dynamic seal between the intermediate portion of the upper medium tube 2 and the innermost lower tube 4 is located on the internal upper flange 33. The sliding bearing and the dynamic seal between the bottom end of the innermost lower tube 4 and the floating upper intermediate tube 5 is located on the internal inwards flange 36 of the innermost lower tube 4.

From the above, it is understood that the inside mid redundant chamber 9 is a longitudinally varying volume depending on position of the flange 34 of the upper medium tube 2 that is movable relatively the innermost lower tube 4.

Furthermore at least one trim device 10 is installed between the upper medium tube 2 and the innermost lower tube 4. Depending on embodiments, trim device(s) 10 is arranged at the internal inwards flange 36 of the innermost lower tube 4. The trim device 10 controls fluid flow between the inside mid redundant chamber 9 and the second chamber 8.

The trim device 10 is for alternative and/or extra gas pressure for extension of the telescoping strut 1. For instance, when gravity or mechanical resistance opposes extension of the telescopic strut 1 and/or if the hydraulic generation architecture HG goes down due to e.g. leaks, the device(s) 10 provides the alternative and/or extra gas pressure.

Thus, extension of the telescoping strut 1 can be obtained as per the invention, under the effect of the central extension chamber 12 and/or the inside mid redundant chamber 9.

In embodiments of the inventive strut 1, a plurality of trim devices 10 are dispatched around the outer periphery of the innermost lower tube 4.

Distinctively, the embodiment of FIG. 5 is depraved of inside mid redundant chamber 9 and therefore of trim device(s) 10. The spacing between the inwards upper flange 34 of the surrounding retraction chamber 13 and the internal lower flange 37 is then vented by a metered venting organ 11, so as to allow sliding motion of the upper medium tube 2 towards and away from the internal inwards flange 36 of the innermost lower tube 4.

Also, the metered venting organ 11 provides a barrier against ingress of pollutants as dust or moisture. Pollutants that would penetrate the spacing between the inwards upper flange 34 of the surrounding retraction chamber 13 and the internal inwards flange 36 would alter proper working of the telescoping strut 1 and of the landing gear LG.

According to another aspect, the central extension chamber 12 of FIG. 5 is extending in the telescoping strut 1 with a slightly varying cross section, from the top end 16 of the upper medium tube 2 to the bottom end 17 of the innermost lower tube 4.

Comparatively, the central extension chamber 12 of FIG. 3 has three successive longitudinal portions each having a cross section distinct from the neighboring portion. FIG. 3 shows an upper longitudinal portion, a medium restricted portion and a lower longitudinal portion.

The upper longitudinal portion extends towards the top end 16 and has an enlarged cross section corresponding to the inner cross section of the upper medium tube 2, i.e. from the inwards upper flange 34 to the internal upper flange 33 along the longitudinal direction X. The lower longitudinal portion extends towards the bottom end of the telescoping strut 1 and has a slightly larger cross section relatively to the cross section of the upper portion.

The lower longitudinal portion extends from the internal upper flange 33 to the bottom of the innermost lower tube 4, along the longitudinal direction X. The medium restricted portion extends between the upper and lower longitudinal portions, i.e. from the internal upper flange 33 to the internal inwards flange 36 along the longitudinal direction X. The cross section of the medium restricted portion corresponds to the inner cross section of the inside mid redundant chamber 9.

According to another aspect, FIG. 3 further shows a telescoping strut 1 with least one damping orifice 19 and one force limiting valve 20. Each of the damping orifice(s) 19 and of one force limiting valve(s) 20 are installed between the floating upper intermediate tube 5 and the outermost damping tube 3.

As exposed later on, the damping orifice 19 used to provide a flow restriction to the damping fluid while streaming from second chamber 8 to the first chamber 6 of the damping system, during compression of the shock absorber part of the telescoping strut 1.

The damping orifice(s) 19 and the force limiting valve(s) 20 are arranged between the first chamber 6 and the second chamber 8, e.g. on the internal lower flange 37 of the floating upper intermediate tube 5.

FIG. 3 further shows force limiting valve(s) 20 aside damping orifice(s) 19, for instance alternating around the internal lower flange 37 of the floating upper intermediate tube 5.

Thus, each force limiting valve 20 is used to limit the forces during (faster) compression of the shock absorber part of the telescoping strut 1 by provision of a second flow path (beside the one of damping orifice(s) 19) for the damping fluid.

The force limiting valve(s) 20 provides an opening gateway beyond a pre-determined threshold.

According to another aspect, at least one extension locking mechanism 21 is installed radially in the telescoping strut 1. The extension locking mechanism 21 is arranged between the floating upper intermediate tube 5 and the upper medium tube 2, i.e. on an upper outer flange 32 of the floating upper intermediate tube 5 at the top end of the surrounding retraction chamber 13.

The extension locking mechanism 21 of these examples is mounted inside the surrounding retraction chamber 13, between an outer shell of the upper medium tube 2 and an inner shell of the floating upper intermediate tube 5.

When activated, the locking mechanism(s) 21 mechanically keeps the upper outer flange 32 of the upper medium tube 2 in a position where the surrounding retraction chamber 13 is shortened until a retraction pressure is applied. Other way speaking, the purpose of the locking mechanism(s) 21 is to maintain the telescoping strut 1 in extended position.

Consequently, the locking mechanism(s) 21 is used to provide a positive mechanical positioning of the surrounding retraction chamber 13 in the status assuming the extended position of the landing gear LG (e.g. for certification requirements).

The locking mechanism(s) 21 may comprise a locking ring or finger(s) which are unlocked upon application of pressure into the surrounding retraction chamber 13.

Furthermore, at least two pairs of mechanical stops 22 are provided in the telescoping strut 1 as shown on FIG. 4.

One pair of mechanical stops 22 is for blocking the inventive telescoping strut 1 in a fully extended position. Another pair of mechanical stops 22 is for blocking the inventive telescoping strut 1 in a fully retraced position.

The mechanical stops 22 of FIG. 4 are mounted on the floating upper intermediate tube 5. In this embodiment, one of them is an upper mid mechanical stop 22B that is mounted inside the surrounding retraction chamber 13. A lowermost mechanical stop 22D is mounted inside the inside mid redundant chamber 9.

The mechanical stops 22B and 22D are for longitudinal stroke limitation of the floating upper intermediate tube 5.

Another stop called lower mid mechanical stop 22C is mounted inside the first chamber 6. An uppermost mechanical stop 22A is mounted outside the floating upper intermediate tube 5. The mechanical stops 22A, 22C are for longitudinal stroke limitation of the outer damping tube 3.

From left to right on FIG. 4, the uppermost mechanical stop 22A is installed in the vicinity of the upper outer flange 32 by the top end of the surrounding retraction chamber 13 for limitation of a maximal compressed stroke of the outer damping tube 3. The upper mid mechanical stop 22B is installed in the vicinity of the bottom end of the surrounding retraction chamber 13, for maximal extension stroke of the upper medium tube 2. The lower mid mechanical stop 22C is installed in the vicinity of the top end of the first chamber 6, for maximal extension stroke of the outermost damping tube 3. A lowermost mechanical stop 22D is installed in the vicinity of the bottom end of the first chamber 6, for maximal retraction stroke of the upper medium tube 2.

According to another aspect, in embodiment of FIG. 5, at least one pair of full reciprocation switches 23 is installed in the telescoping strut 1. One full reciprocation switch 23A of the pair is installed outwardly in the vicinity of a top end of the upper medium tube 2, to indicate that the fully retracted position is reached by the telescoping strut 1.

Another full reciprocation switch 23B is installed outwardly in the vicinity of the top end the floating upper intermediate tube 5, to indicate that the fully extended position is reached by the telescoping strut 1. The full reciprocation switch 23B is arranged upright the upper outer flange 32 of the floating upper intermediate tube 5.

The full reciprocation switch 23B of FIG. 5 is arranged so as to be instantly coupled with the extension locking mechanism 21 in charge of securing the fully extended position when needed.

As explained later on, the full reciprocation switches 23A, 23B are used (independently from the commanded extended/retracted position) to verify and indicate the fulfillment/reaching of the commanded position, either the fully retracted or the fully extended concluded by positively locking the telescoping strut 1

For instance, the information is displayed on the human-machine interface on board the aircraft, for information to the air-crew.

According to another aspect, the central extension chamber 12 is pre-pressurized. Thus, an extension positive pressure is a minima maintained in the central extension chamber 12. In the embodiment of FIG. 6, the extension positive pressure is a gas pressure e.g. pneumatic. In the embodiment of FIG. 6, the extension positive pressure in the central extension chamber 12 is chosen between 0.5 MPa and 1 MPa.

Thus, the central extension chamber 12 behaves as an expanding spring that constantly tends to pull apart along the longitudinal direction X, the top end 16 of the upper medium tube 2 away from the bottom end 17 of the innermost lower tube 4 together with the bottom end of the outermost damping tube 3.

Moreover, whatever the embodiment, FIGS. 3-8 shows that the telescoping strut 1 has only one fluid input/output passage 24. The single fluid input/output passage 24 is located on the upper outer flange 32 of the floating upper intermediate tube 5. The fluid input/output passage 24 allows fluid circulation from the hydraulic pump U of the hydraulic generation architecture HG, to the surrounding retraction chamber 13. Therefore, only the surrounding retraction chamber 13 can be fed by the hydraulic generation architecture HG.

Figure 7:
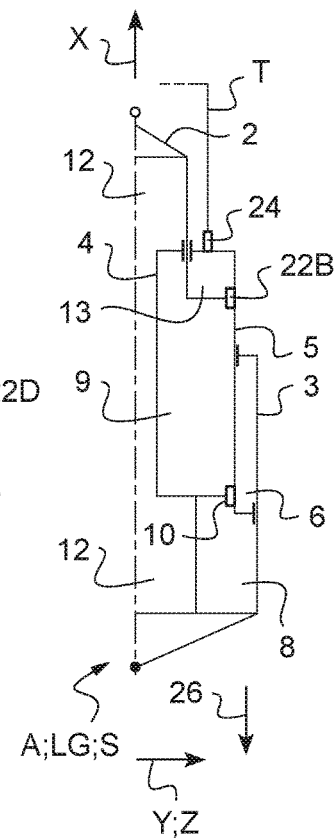
FIG. 7 is a view similar to the one of FIG. 6, showing the inventive telescoping strut in an extended position.
Figure 8:
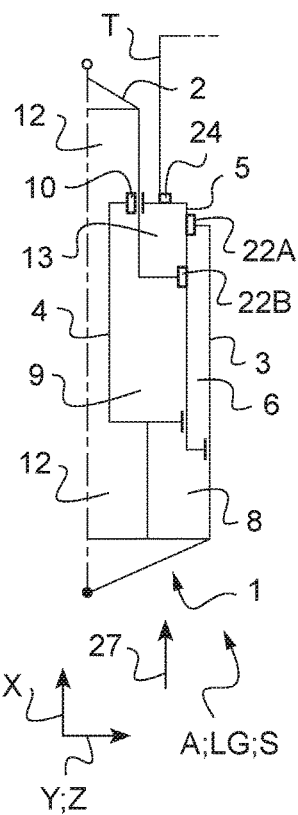
FIG. 8 is a view similar to the one of FIG. 6 or 7, showing the inventive telescoping strut in a compressed position.

Now referring to FIGS. 6-8, operation of the telescoping strut 1 and of a landing gear LG equipped with such a strut 1 are exposed.

In the central extension chamber 12, e.g. on FIG. 7, the extension positive pressure i.e. the nominal pre-pressurized gas pressure, is chosen between 0.5 MPa and 1 MPa.

In the first chamber 6, the extension force generated by the pressure of the gas is chosen to be superior to the ground/weight loads of the aircraft A.

In the embodiment of FIG. 8, the first pre-loaded pressure i.e. the nominal pre-pressurized gas pressure is chosen between 1 MPa and 2 MPa.

Referring to FIG. 6, the retraction of the telescoping strut is operated under a retraction command. A retraction motion 25 makes the top end and the bottom end of the telescoping strut 1 to get closer one relatively the other, along the longitudinal direction X.

The retraction command is given by the displacement of a control valve in the hydraulic unit 7 to direct hydraulic pressure which unlocks all the extension locking mechanism(s) 21. The unlocking occurs prior to flowing into the surrounding retraction chamber 13 of the fluid.

Hydraulic pressure and flow raises in the surrounding retraction chamber 13 until overcoming the weight force of the moving elements of the telescoping strut 1 as well as the friction of the dynamic seals.

A so-called overcoming fluid pressure of a predetermined value is chosen to be able to move the upper medium tube 2 until it reaches the retraction end, i.e. the lowermost mechanical stop 22D, as showed on FIG. 6.

The invention therefore provides that when retraction is needed, the fluid input/output passage 24 is fed by the hydraulic generation architecture HG, to raise pressure in the surrounding retraction chamber 13 by a so-called overcoming fluid pressure.

Thus, the overcoming fluid pressure provokes the longitudinal shortening of the surrounding retraction chamber 13. This longitudinal shortening operates retraction of the telescoping strut 1 when the surrounding retraction chamber 13 is fed through the fluid input/output passage 24 with the overcoming fluid pressure that overwhelms the extension positive pressure in the central extension chamber 12.

The effect of the expanding spring operated by the pre-pressurized central extension chamber 12 is thus counteracted by the surrounding retraction chamber 13 when activated.

Referring to FIG. 7, the extension of the telescoping strut is operated under an extension command. The extension command is given by the displacement of the control valve in the hydraulic unit 7, in a status corresponding to the one showed on FIG. 3, i.e. providing a fluidic connection between the input/output pressure channel T and the reservoir R.

An extension motion 26 makes the top end and the bottom end of the telescoping strut 1 to move away one relatively the other, along the longitudinal direction X.

The displacement of the control valve re-directs the fluid towards the reservoir R. This re-directing of the fluid is indeed supported by the pneumatic power released by the central extension chamber 12 and optionally by the inside mid redundant chamber 9. Prior to reaching the maximal extended position, the extension locking mechanism 21 is locked again.

Pneumatic pressure together with the weight force of the moving tubes overcomes the friction of the dynamic seals. The maximal extended position is defined by the upper mid mechanical stop 22B, as shown on FIG. 7 where the overall longitudinal dimension of the telescoping strut 1 is maximal.

Referring to FIG. 8 is shown a shock absorbing compression position of the telescoping strut 1, where the overall longitudinal dimension of the telescoping strut 1 is reduced relatively to the extended position. Of course, damping occurs when the landing gear LG is extended, i.e. ready for use.

Thus, a damping motion 27 makes the top end and the bottom end of the telescoping strut 1 to get closer one relatively the other, along the longitudinal direction X.

Pre-loaded by the gas pressure of the first chamber 6, the telescoping strut 1 that is in the extended position prior e.g. to the landing of the aircraft, can be compressed or partially compressed.

The telescoping strut 1 is compressed through the effect of landing force, until equilibrium of landing forces versus pressure is stabilized between the first chamber 6 and the second chamber 8.

During a compression or a damping motion 27, a volume of fluid contained in the second chamber 8 is pushed to the first chamber 6. Then, the first chamber 6 behaves as an expanding or pneumatic spring with a damping function during the damping motion 27.

Equilibrium of landing forces versus pressure occurs at a given damping stroke position of the outermost damping tube 3 and of the floating upper intermediate tube 5. A maximal damping stroke position of the outermost damping tube 3 is limited by the uppermost mechanical stop 22A. A maximal damping stroke position of the floating upper intermediate tube 5 is limited by the lower mid mechanical stop 22C.

Figure 9:
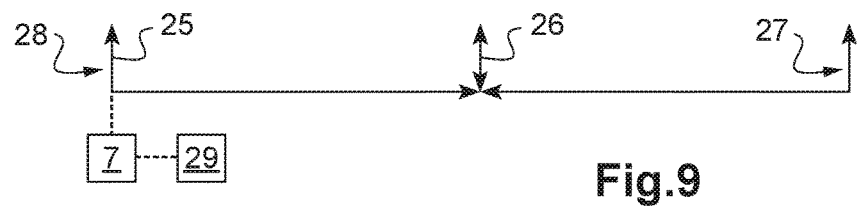
FIG. 9 is a schematic diagram illustration the operating method of the invention, with retraction, extension and damping motions.

According to FIG. 9, the operating method 28 includes consequently the steps of retraction of the telescoping strut 1 as illustrated by the retraction motion 25, of normal extension as illustrated by the extension motion 26, and of shock absorbing by the telescoping strut 1 as illustrated by the damping motion 27. These motions 25, 26, 27 are for operating corresponding steps and functions of the landing gear LG.

A control interface 29 orders the hydraulic unit 7 for execution of the above steps and motions.

Typically, the control interface 29 is belonging to a Human-Machine-Interface (HMI) such as a command button in the aircraft cockpit and actuated when needed, by a human operator e.g. the pilot. Otherwise or in parallel, the control interface 29 is automatic, e.g. is belonging to an automatic flight system.

The steps of the operation method 28 are shown on FIG. 6 for the retracted position, and the corresponding status of the controlling hydraulic unit. The FIG. 7 shows the extended position. The FIG. 8 shows the compressed position during the damping step.

With the telescoping strut 1 according the invention, the retraction step results from a retraction command provoking the displacement of the control valve in the hydraulic unit 7 as exposed above.

Initially, the full reciprocation switch 23 in the vicinity of the top end of the floating upper intermediate tube 5 indicates that the fully extended position of the central extension chamber 12 is obtained. Meanwhile, corresponding mechanical stops 22 physically limit the full extension position.

The displacement of the control valve then makes the hydraulic generation architecture HG to communicate with the fluid input/output passage 24 of the telescoping strut 1, with the overcoming fluid pressure overwhelming the extension positive pressure and opposing the effect of the central extension chamber 12.

For achieving the retraction step, each extension locking mechanism 21 is previously released to stop mechanically keeping the telescoping strut 1 in the fully extended position. Each extension locking mechanism 21 is activated until the overcoming fluid pressure is applied for retraction effect by the surrounding retraction chamber 13.

Afterwards, the full reciprocation switch 23 indicates that a fully retracted position of the telescoping strut 1 is reached, thanks to finalized feeding of the surrounding retraction chamber 13.

Then, corresponding mechanical stops 22 physically limit the full retraction of the upper medium tube 2, of the outermost damping tube 3 and of the floating upper intermediate tube 5.

In an embodiment of the inventive method, is provided a step of emergency extension of the telescoping strut 1.

Advantageously, the emergency extension step can be operated when the telescoping strut 1 is depraved of fluid pressure from the hydraulic generation architecture HG. Thus, the emergency extension step allows the aircraft A to have the landing gear LG fully extended e.g. conveniently for hard touch down.

As per the invention, the step of emergency extension includes unlocking corresponding mechanical stop(s) 22, to let the innermost lower tube 4 slidably moving, relatively the upper medium tube 2 under the effect of the pre-pressure in the central extension chamber 12. Other way speaking, when locking of the corresponding mechanical stop(s) 22 is released and the fluid input/output passage 24 is not fed, the inventive telescoping strut 1 stretches longitudinally to have the landing gear LG reaching the needed extended position.

Optionally, in the emergency extension step, the fully extended position of the telescoping strut 1 is secured with the participation of the inside mid redundant chamber 9 and/or the chambers 6/8.

The gas pressure together with the weight force of the moving elements overcomes the friction of the piston seals.

It is understood that the invention aims that the telescoping strut 1 transfers the compression loads from the landing gear LG without buckling, while providing a moderate inner piston area for pressurized fluid/gas extension.

The so-called piston area is the available cross section surface extending radially along a plane orthogonal to the longitudinal direction X, for pressure to apply in a corresponding chamber.

Thanks to the floating upper intermediate tube 5, the invention benefits from the square increase of piston area versus the diameter for retraction purpose.

Another benefit of the invention is that the outermost damping tube 3 allows to profit from the square increase of piston area versus diameter for spring and damping purposes, with comparably a higher force value.

To conclude, the invention offers for instance:
- optimized location and sizing of retraction pistons areas of telescopic components, without increasing the overall weight and friction of the landing gear LG;
- simple functions and structure for retraction, extension and damping;
- appropriated sizing of volume of fluid to be shifted from a fluid reservoir R for each function requiring this, versus the overall dimensions of the various components of the hydraulic generation architecture HG; and
- appropriately sized flows on demand from the hydraulic source pump U during retraction/normal extension operations, due to required shifted hydraulic volume.

Optionally, in case of emergency, a back-up pneumatic pre-pressure in the central extension chamber 12 or from the inside mid redundant chamber 9 can be made promptly available for emergency extension, without involving use of the need for hydraulic generation architecture HG.

The following table lists the references signs in the drawings.

1 telescoping strut
2 upper medium tube
3 outermost damping tube
4 innermost lower tube
5 floating upper intermediate tube
6 first chamber
7 hydraulic unit
8 second chamber
9 inside mid redundant chamber
10 trim device
11 venting organ
12 central extension chamber
13 surrounding retraction chamber
14 top end of innermost lower tube 4
15 bottom end of upper medium tube 2
16 top end of upper medium tube 2
17 bottom end of innermost lower tube 4
19 damping orifice(s)
20 force limiting valve(s)
21 extension locking mechanism
22 mechanical stops (22A, 22B, 22C, 22D)
23 reciprocation switches (23A, 23B)
24 fluid input/output passage
25 retraction motion
26 extension motion
27 damping motion
28 operation process
29 control interface
30 check valve/non-return valve
31 inwards upper flange
32 upper outer flange
33 internal upper flange
34 inwards upper flange
35 outer inwards flange
36 internal inwards flange
37 internal lower flange
101 low-pressure shock absorber charging valve
102 upper rod
103 strut casing
104 plunger tube
105 actuator rocker lever
106 hydraulic fluid distribution valves
107 hydraulic unit
108 high-pressure shock absorber charging valve
109 bottom throttling valve
110 flexible locking claws
111 locking ring
112 retraction actuator
113 retracted position switch
114 switch actuator
115 top throttling valve
116 extension chamber
117 high-pressure shock absorber fluid chamber
118 retracting chamber
119 hi-pressure gas chamber
A aircraft
CE body structure
D extension chamber
EE pressure input
EN power plant
F retraction chamber
G low-pressure shock absorber nitrogen/fluid chamber
H low-pressure shock absorber fluid chamber
HG hydraulic generation architecture
K upper extension chamber
LG landing gears
MR main rotor
NER normal extension or retraction input/output R fluid reservoir
RNE normal and emergency extension or retraction I/O
S pressurized fluid telescoping system
T input/output pressure channels
U hydraulic source pump
WE wheels
X longitudinal direction
XYZ referential
Y transverse direction
Z crosswise direction.

The invention may be subjected to variations as to its implementation, said variations not being possibly identified exhaustively.

What is claimed is:

1. A telescoping strut for extension/retraction/damping of a landing gear in an aircraft, the telescoping strut comprising at least an extension chamber, a retraction chamber and a damper chamber, each of the extension, retraction and damper chambers being formed by tubes slidably telescoping along a longitudinal direction of the telescoping strut, the telescoping strut comprising two attachment connectors for securing the telescoping strut to the landing gear and to a body structure of the aircraft, wherein the tubes comprise an upper medium tube and an innermost lower tube forming together a sealed outer shell for the extension chamber that is central and pre-pressurized, the central extension chamber lengthening centrally in the telescoping strut between a top end of the upper medium tube and a bottom end of the innermost lower tube along the longitudinal direction; a top end of the innermost lower tube being slidably guided in an intermediate portion between ends of the upper medium tube along the longitudinal direction, the upper medium tube being rigidly secured to one of the attachment connectors and the innermost lower tube being rigidly secured to the other attachment connector;

the telescoping strut further comprising an outermost damping tube and a floating upper intermediate tube, an outer shell of the upper medium tube and an inner shell of the floating upper intermediate tube forming together the surrounding retraction chamber that is radially surrounding the central extension chamber locally, the telescoping strut having only one fluid input/output passage for fluid circulation from an hydraulic source in an hydraulic generation architecture of the aircraft to the surrounding retraction chamber for opposing an extension positive pressure in the central extension chamber so that the surrounding retraction chamber counteracts the extension positive pressure to provoke a longitudinal shortening of the central extension chamber operating retraction of the telescoping strut when the surrounding retraction chamber is fed through the fluid input/output passage with an overcoming fluid pressure overwhelming the extension positive pressure; and the floating upper intermediate tube being slidably guided around the upper medium tube and being slidably guided in the outermost damping tube, the outermost damping tube being rigidly secured to one of the attachment connectors; the outermost damping tube and the floating upper intermediate tube forming together a first chamber that is pre-pressurized at a first pre-loaded pressure; the outermost damping tube and the innermost lower tube forming together a second chamber that is pre-pressurized with a fluid at a second pre-loaded pressure and that is selectively communicable with the first chamber.

2. A telescoping strut according to claim 1, wherein the second chamber is outwardly delimited by the outermost damping tube and the floating upper intermediate tube, the innermost lower tube inwardly delimiting the second chamber.

3. A telescoping strut according to claim 1, wherein locally the first chamber is outwardly delimited by the outermost damping tube and inwardly by the floating upper intermediate tube.

4. A telescoping strut according to claim 1, wherein at least one force limiting valve is installed on an outwards internal flange of the floating upper intermediate tube.

5. A telescoping strut according to claim 1, wherein at least one damping orifice is installed between the floating upper intermediate tube and the outermost damping tube, the damping orifice controlling a flow between the first chamber and the second chamber for providing a flow restriction to the fluid while streaming from the first chamber to the second chamber during shock absorbing compression of the telescoping strut.

6. A telescoping strut according to claim 1, wherein at least one extension locking mechanism is installed on the floating upper intermediate tube to mechanically keep the surrounding retraction chamber in a shortened position determined for extension of the telescoping strut until the overcoming fluid pressure is applied to the surrounding retraction chamber.

7. A telescoping strut according to claim 1, wherein at least two pairs of mechanism stops are mounted on the floating upper intermediate tube, for limiting an extension longitudinal stroke and a retraction/contraction longitudinal stroke of the floating upper intermediate tube relatively the upper medium tube along the longitudinal direction.

8. A telescoping strut according to claim 1, wherein the extension positive pressure in the central extension chamber is chosen between 0.5 MPa and 1 MPa.

9. A telescoping strut according to claim 1, wherein the first pre-loaded pressure in the first chamber is chosen between 1 MPa and 2 MPa.

10. A landing gear for an aircraft having a body structure and an hydraulic generation architecture, the landing gear having at least one touch-down device, wherein the landing gear comprises at least one telescoping strut according to claim 1 and articulated to the body structure, the landing gear being articulated to the touch-down device, the fluid input/output passage of the telescoping strut being connected to the hydraulic generation architecture to provide for extension function of the landing gear when the fluid input/output passage is fed.

11. An aircraft having at least a landing gear, a body structure and an hydraulic generation architecture, wherein the landing gear is according to claim 10, the hydraulic generation architecture being operatively connected to the telescoping strut and being under control of an hydraulic unit of the hydraulic generation architecture, the hydraulic generation architecture comprising at least one hydraulic pump connected by a single pressure channel to the hydraulic unit for fluid circulation from a fluid reservoir to the telescoping strut, the hydraulic unit being connected to the fluid input/output passage of the telescoping strut.

12. A method of operating a landing gear in an aircraft, the method including the steps of:
retraction motion of a telescoping strut,
extension motion of the telescoping strut, and
damping motion by the telescoping strut for operating the damping function of the landing gear, wherein the telescoping strut is according to claim 1, the extension motion being operated without the surrounding retraction chamber fed by an hydraulic generation architecture of the aircraft and the retraction motion results from a retraction command provoking the displacement of a control valve in an hydraulic unit of the hydraulic generation architecture, the displacement of the control valve allowing the hydraulic generation architecture to feed the fluid input/output passage of the telescoping strut with the overcoming fluid pressure, so as to overwhelm the extension positive pressure and oppose the effect of the central extension chamber.

13. Method according to claim 12, wherein the telescoping strut has an inside mid redundant chamber that is pre-pressurized, and the method includes a step of emergency extension of the telescoping strut without fluid pressure from the hydraulic generation architecture, the step of emergency extension provides releasing the floating upper intermediate tube and the innermost lower tube slidably moving relatively the upper medium tube under effect of the pre-pressure in the central extension chamber and/or the inside mid redundant chamber.

14. A telescoping strut for a landing gear in an aircraft, the telescoping strut comprising an extension chamber, a retraction chamber and a damper chamber, each of the extension, retraction and damper chambers defined by tubes slidably telescoping along a longitudinal direction of the telescoping strut, the telescoping strut comprising two attachment connectors for securing the telescoping strut to the landing gear and to a body structure of the aircraft, wherein the tubes comprise an upper medium tube and an innermost lower tube defining a sealed outer shell for the extension chamber that is central and pre-pressurized, the central extension chamber lengthening centrally in the telescoping strut between a top end of the upper medium tube and a bottom end of the innermost lower tube along the longitudinal direction; a top end of the innermost lower tube being slidably guided in an intermediate portion between ends of the upper medium tube along the longitudinal direction, the upper medium tube being rigidly secured to one of the attachment connectors and the innermost lower tube being rigidly secured to the other attachment connector;

the telescoping strut further comprising an outermost damping tube and a floating upper intermediate tube, an outer shell of the upper medium tube and an inner shell of the floating upper intermediate tube defining the surrounding retraction chamber that is radially surrounding the central extension chamber locally, the telescoping strut having only one fluid input/output passage for fluid circulation from an hydraulic source in an hydraulic generation architecture of the aircraft to the surrounding retraction chamber for opposing an extension positive pressure in the central extension chamber so that the surrounding retraction chamber counteracts the extension positive pressure to provoke a longitudinal shortening of the central extension chamber operating retraction of the telescoping strut when the surrounding retraction chamber is fed through the fluid input/output passage with an overcoming fluid pressure overwhelming the extension positive pressure; and the floating upper intermediate tube being slidably guided around the upper medium tube and being slidably guided in the outermost damping tube, the outermost damping tube being rigidly secured to one of the attachment connectors; the outermost damping tube and the floating upper intermediate tube defining a first chamber that is pre-pressurized at a first pre-loaded pressure; the outermost damping tube and the innermost lower tube defining a second chamber that is pre-pressurized with a fluid at a second pre-loaded pressure and that is selectively communicable with the first chamber, wherein the second chamber is outwardly delimited by the outermost damping tube and the floating upper intermediate tube, the innermost lower tube inwardly delimiting the second chamber.

15. A telescoping strut according to claim 14, wherein locally the first chamber is outwardly delimited by the outermost damping tube and inwardly by the floating upper intermediate tube.

16. A telescoping strut according to claim 14, wherein an extension lock is installed on the floating upper intermediate tube to mechanically maintain the surrounding retraction chamber in a shortened position determined for extension of the telescoping strut until the overcoming fluid pressure is applied to the surrounding retraction chamber.

17. A telescoping strut according to claim 14, wherein two pairs of mechanism stops are mounted on the floating upper intermediate tube, for limiting an extension longitudinal stroke and a retraction/contraction longitudinal stroke of the floating upper intermediate tube relatively the upper medium tube along the longitudinal direction.

18. A telescoping strut for a landing gear in an aircraft, the telescoping strut comprising an extension chamber, a retraction chamber and a damper chamber, each of the extension, retraction and damper chambers defined by tubes slidably telescoping along a longitudinal direction of the telescoping strut, the telescoping strut comprising two attachment connectors for securing the telescoping strut to the landing gear and to a body structure of the aircraft, wherein the tubes comprise an upper medium tube and an innermost lower tube defining a sealed outer shell for the extension chamber that is central and pre-pressurized, the central extension chamber lengthening centrally in the telescoping strut between a top end of the upper medium tube and a bottom end of the innermost lower tube along the longitudinal direction; a top end of the innermost lower tube being slidably guided in an intermediate portion between ends of the upper medium tube along the longitudinal direction, the upper medium tube being rigidly secured to one of the attachment connectors and the innermost lower tube being rigidly secured to the other attachment connector;

the telescoping strut further comprising an outermost damping tube and a floating upper intermediate tube, an outer shell of the upper medium tube and an inner shell of the floating upper intermediate tube defining the surrounding retraction chamber that is radially surrounding the central extension chamber locally, the telescoping strut having only one fluid input/output passage for fluid circulation from an hydraulic source in an hydraulic generation architecture of the aircraft to the surrounding retraction chamber for opposing an extension positive pressure in the central extension chamber so that the surrounding retraction chamber counteracts the extension positive pressure to provoke a longitudinal shortening of the central extension chamber operating retraction of the telescoping strut when the surrounding retraction chamber is fed through the fluid input/output passage with an overcoming fluid pressure overwhelming the extension positive pressure; and the floating upper intermediate tube being slidably guided around the upper medium tube and being slidably guided in the outermost damping tube, the outermost damping tube being rigidly secured to one of the attachment connectors; the outermost damping tube and the floating upper intermediate tube defining a first chamber that is pre-pressurized at a first pre-loaded pressure; the outermost damping tube and the innermost lower tube defining a second chamber that is pre-pressurized with a fluid at a second pre-loaded pressure and that is selectively communicable with the first chamber, wherein locally the first chamber is outwardly delimited by the outermost damping tube and inwardly by the floating upper intermediate tube.

19. A telescoping strut according to claim 18, wherein an extension lock is installed on the floating upper intermediate tube to mechanically maintain the surrounding retraction chamber in a shortened position determined for extension of the telescoping strut until the overcoming fluid pressure is applied to the surrounding retraction chamber.

20. A telescoping strut according to claim 18 wherein two pairs of mechanism stops are mounted on the floating upper intermediate tube, for limiting an extension longitudinal stroke and a retraction/contraction longitudinal stroke of the floating upper intermediate tube relatively the upper medium tube along the longitudinal direction.

\* \* \* \* \*